Aug. 29, 1944.     W. L. MORRISON     2,356,781
REFRIGERATING APPARATUS
Filed Aug. 2, 1941     4 Sheets-Sheet 1
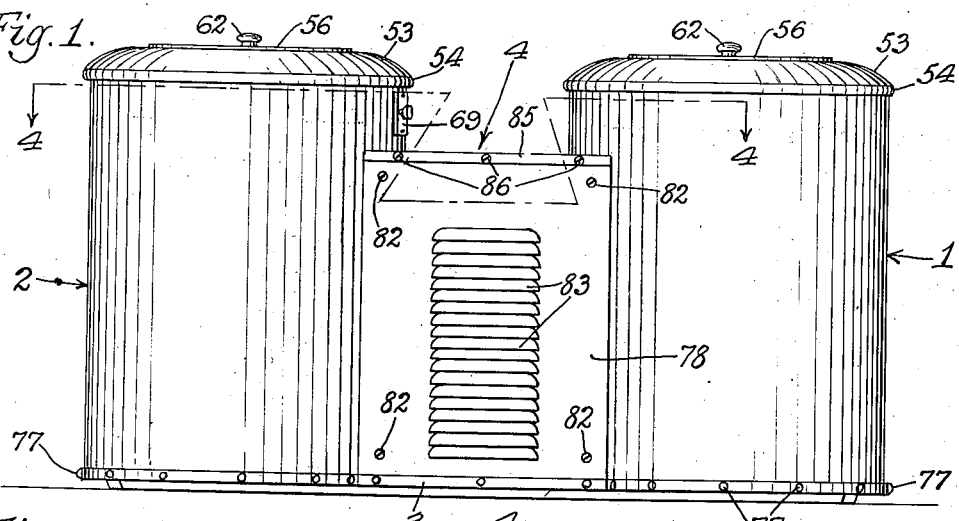
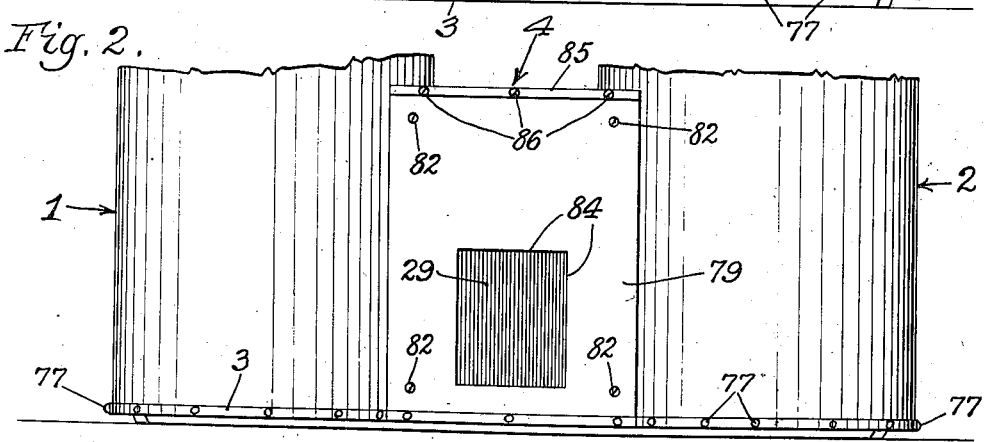
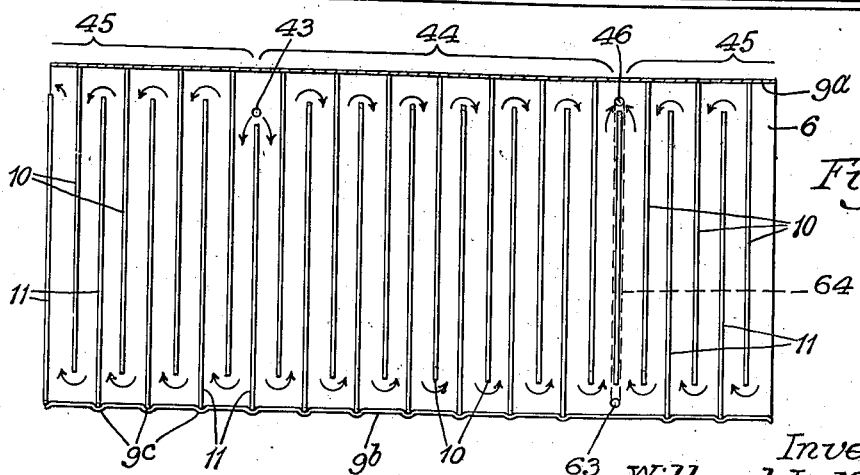
Inventor.
Willard L. Morrison.
by Parker & Carter
Attorneys.

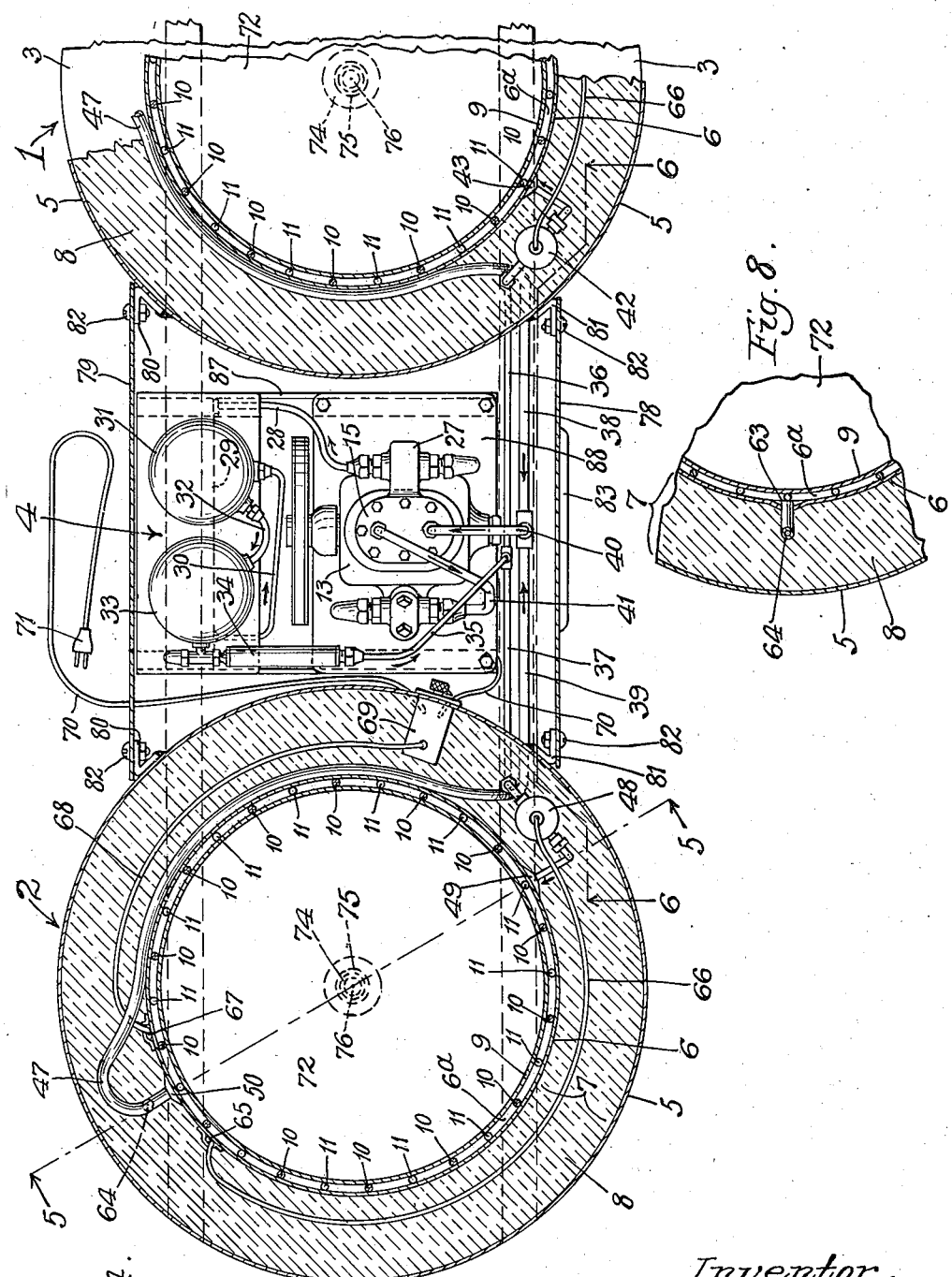

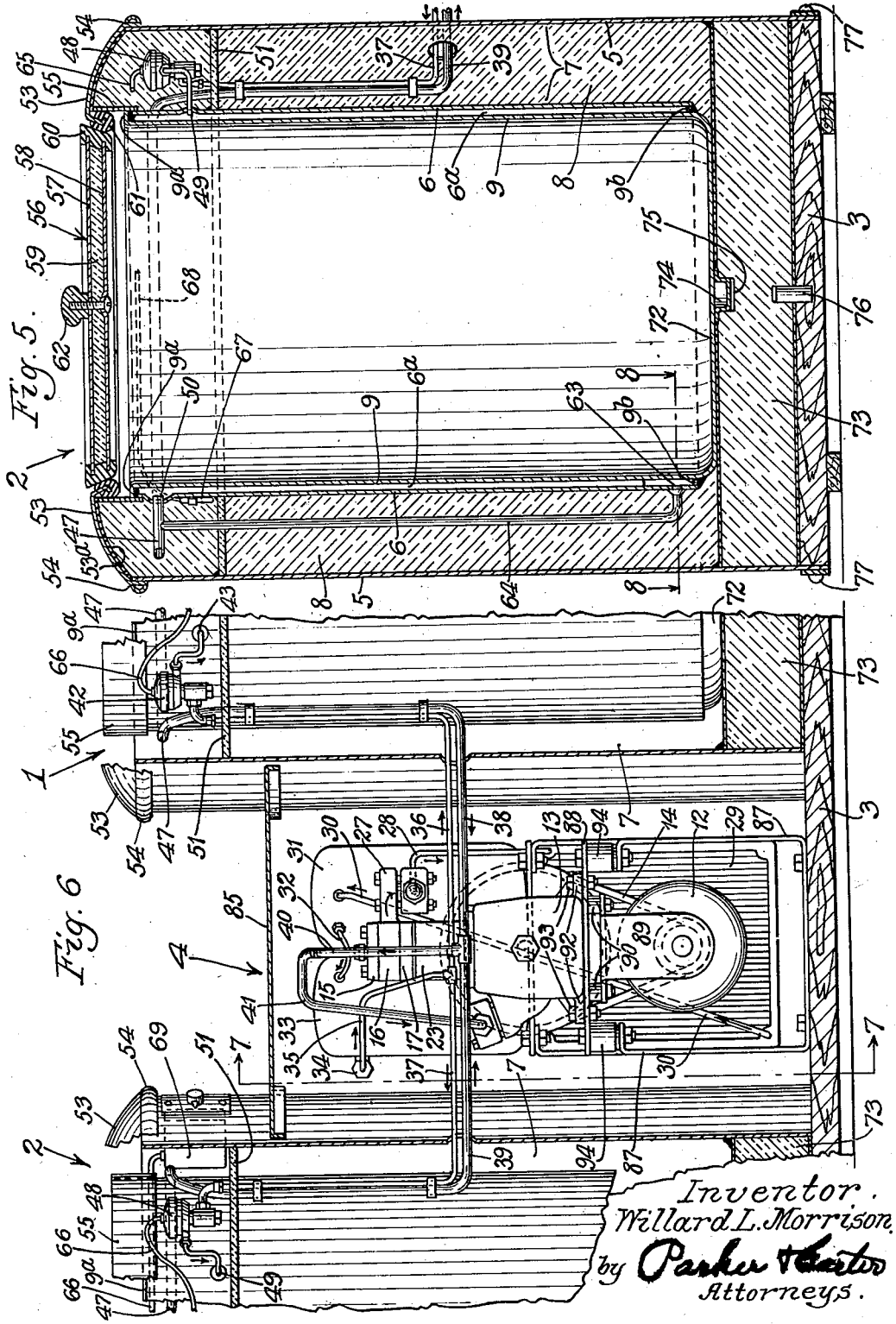

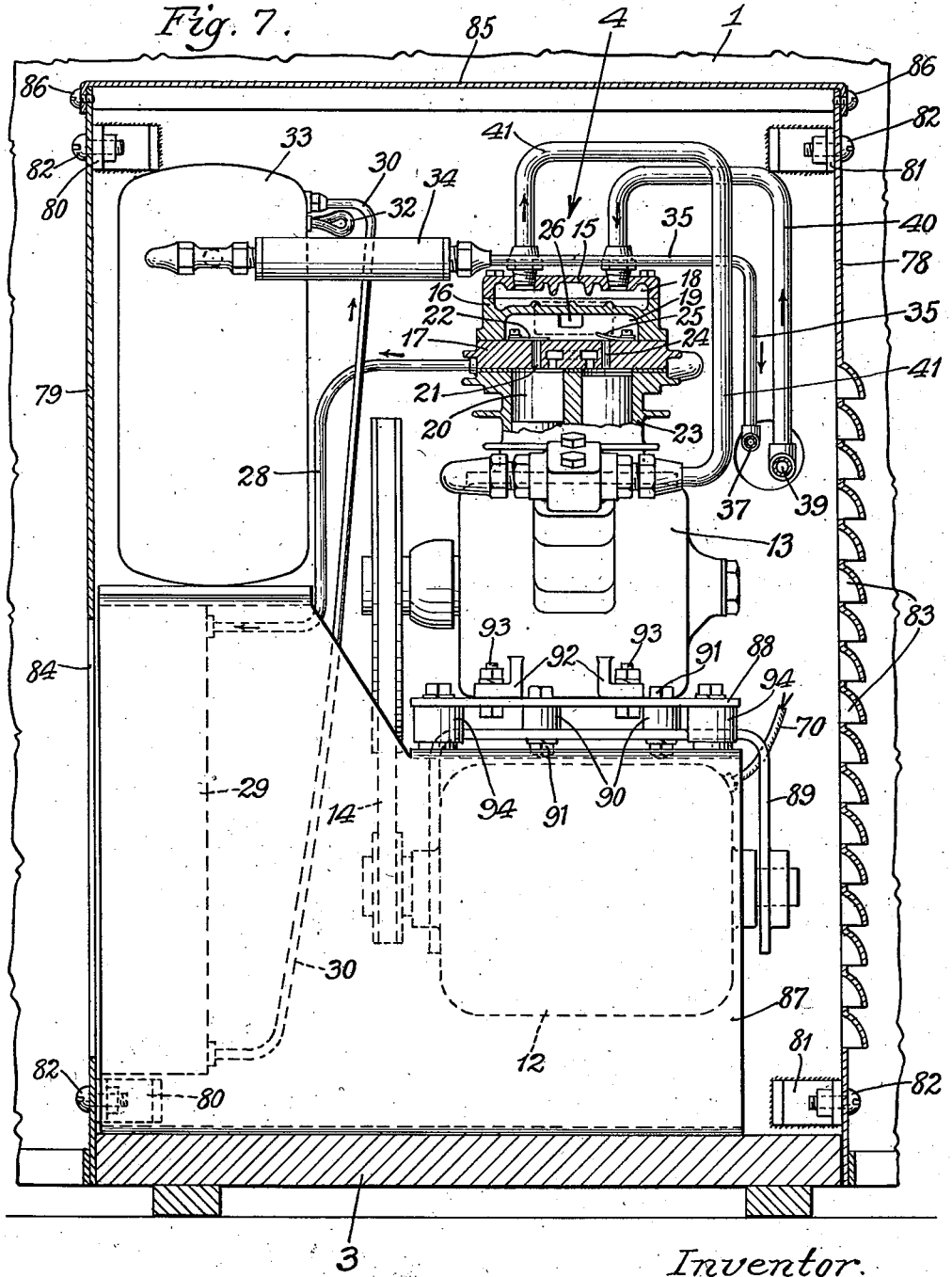

Patented Aug. 29, 1944

2,356,781

UNITED STATES PATENT OFFICE 2,356,781

REFRIGERATING APPARATUS

Willard L. Morrison, Lake Forest, Ill.

Application August 2, 1941, Serial No. 405,173

5 Claims. (Cl. 62—116)

This invention relates to refrigerating apparatus for lowering the temperature of foods below the freezing point and of metals and other materials to a low temperature, and has for its object to provide a new and improved device of this description.

The invention has as a further object to provide a refrigerating apparatus by means of which exceedingly low temperatures may be secured, as low as, for example −50° F., which refrigerating apparatus can be used not only in freezing foods but can be used in the mechanical arts for cooling metal pieces which are to fit tightly into openings so as to shrink them and permit them to be inserted in the openings so that when they attain normal temperature, they will expand to make a tight fit so that the parts cannot be separated.

The invention has as a further object to provide two separate cooling units with a single refrigerating unit for supplying refrigerant material to said two cooling units.

The invention has as a further object to provide two separate cooling units with a single refrigerating unit for supplying refrigerant material to said two cooling units and means for automatically changing the amount of refrigerant material supplied by said single refrigerant unit to either of said cooling units, responsive to the varying needs of each of said cooling units.

The invention has as a further object to provide two cooling units having one refrigerating unit to serve both cooling units with a common gas pressure.

The invention has as a further object to provide a refrigerating device comprising two cooling units with a refrigerating apparatus intermediate to supply both of them, the refrigerating units and refrigerating apparatus being fastened together to form a single unitary structure.

The invention has a further object to provide a refrigerating unit with a cooling head on the compressor wherein the cold refrigerant returning from the evaporator enters a special cooling head at the top of the compressor and passes through this special cooling head so as to assist in cooling the compressor and is then delivered to the compressor.

The invention has as a further object to provide a refrigerating apparatus for securing a low temperature and providing an additional means associated with the compressor for still lowering the temperature a further amount.

The invention has other objects which are more particularly pointed out in the accompanying description.

Referring now to the drawings:

Fig. 1 is a front view of one form of device embodying the invention;

Fig. 2 is a rear view of the device shown in Fig. 1 with parts removed;

Fig. 3 is a view of the passageway through the evaporator, straightened out;

Fig. 4 is an enlarged sectional view taken on line 4—4 of Fig. 1;

Fig. 5 is a sectional view taken on line 5—5 of Fig. 4;

Fig. 6 is a sectional view taken on line 6—6 of Fig. 4;

Fig. 7 is a sectional view taken on line 7—7 of Fig. 6;

Fig. 8 is a sectional view taken on line 8—8 of Fig. 5;

Like numerals refer to like parts throughout the several figures.

In the construction herein illustrated there are two separate freezing units, 1 and 2, similar in construction and separated by a space and mounted upon a base 3, there being located in the space between the freezing units a refrigerating apparatus 4. The freezing unit 2 has an outer cylinder 5, preferably of metal. Within this outer cylinder there is a second cylinder 6 of metal. The space 7 between these two cylinders contains suitable heat insulating material 8. Within the cylinder 6 is a third cylinder 9 which is smaller in diameter than the cylinder 6, the two cylinders 6 and 9 being separated by a space. The cylinders 6 and 9 form the evaporator for the freezing unit. The space between the cylinders 6 and 9 is divided into a series of sections which are connected together to form a passageway extending back and forth along the cylinders longitudinally of the cylinders. The space 6a between the cylinders 6 and 9 of each unit is closed in any desired manner at its upper and lower ends. As herein shown, the inner cylinder 9 has its upper edge 9a bent outwardly and the upper edge of the cylinder 6 is fastened thereto by welding, or otherwise, so as to form a sealed joint. At the bottom the cylinder 9 is provided with a projecting ring 9b which is either integral therewith or welded or otherwise fastened thereto and when the passage forming members are placed in position, this ring is fastened by welding or otherwise to the cylinders 9 and 6 so as to form a sealed joint, and has bent portions 9c.

The series of sections of the passageway are preferably formed by passageway forming members separate from the cylinders and inserted in the space between them. These passageway forming members are shown as cylindrical. The members 10 extend in one direction beyond the members 11 and to the end of the cylinders (Fig. 3). The members 11 extend beyond the other ends of the members 10 and to the end of the cylinders, preferably having their ends fitting in recesses formed by the bent portions 9c. These members are held in position in any desired manner, preferably by welding or soldering at one or more places.

The refrigerating apparatus 4 is mounted upon the same base 3 as the freezing units 1 and 2. The base 3 is preferably of heat insulating material. The freezing units and refrigerating apparatus are connected together so as to form a unitary structure which can be moved from place to place wherever it is desired to use the device.

Any suitable refrigerating apparatus may be used. In the drawings I have illustrated a refrigerating apparatus comprising a motor 12 and a compressor 13 driven from the motor by the belt 14. There is provided, as an attachment to the compressor, a gas cooled head, that is a head through which the refrigerant gas from the evaporators of the freezing units is passed before entering the compressor. This gas cooled head comprises the parts 15 and 16 (Fig. 7) mounted upon the top 17 of the compressor and are provided with the chambers 18 and 19. The cylinder 20 of the compressor is connected with the chamber 19 by the passage 21 having a check valve 22 at the upper end thereof.

The cylinder 23 of the compressor is connected by the passage 24 with the chamber 19 and is provided with a check valve 25 at the upper end thereof. The gas when compressed by the compressor passes out through the opening 26 to the chamber 27 (Fig. 4) and then passes through pipe 28 and is then delivered to the top of the condenser 29. The gas then passes from the condenser through pipe 30 into the receiving tank 31 and thence by the pipe 32 into the receiving tank 33 and thence through the strainer 34 and pipe 35 to the pipes 36 and 37 and is delivered, as the conditions demand, to the two freezing units. The gas passes out of the freezing unit 1 into the pipe 38 and from the freezing unit 2 into the pipe 39 and then passes by pipe 40 into the chamber 18 (see Fig. 7) and then through this chamber and out through the pipe 41 to the compressor 13.

The refrigerant from the compressor 13 and the receivers 31 and 33 passes to the pipe 35 (Fig. 6), to the cooling unit 1, through pipe 36 and the expansion valve 42 and thence through the inlet 43 into the passageway between the members 6 and 9 intermediate its ends. Part of the refrigerant passes to the right (Fig. 3) along that portion 44 of this passageway and part of it passes to the left of that portion 45 of the continuous passageway. The two portions of the refrigerant meet at the outlet 46 and then pass through pipe 47, through the pipe 38, pipe 40, chamber 18, pipe 41 into the compressor 13. The portion of the refrigerant passing to the cooling unit 2 passes through the pipe 37 to the expansion valve 48 and then in through the inlet 49 through the passageway between the cylinders 6 and 9 of heating unit 2, entering this passageway near the middle and going in either direction in the same manner as illustrated in Fig. 3. Refrigerant material then passes out of the outlet 50 into pipe 47 and thence through pipes 39 and 40, chamber 18, and pipe 41 to the compressor 13.

There is located in the space between the cylinders 5 and 6, near the top thereof, the sealing partitions 51. In the space above these partitions, so as to be easily accessible, are located the expansion valves 42 and 48. Comparably loose insulation is preferably placed in the space around the expansion valves so that they can be easily reached by taking off the cover 53 provided for each unit. Each cover 53 has a portion 54 which fits down over the outside cylinder 5. The cover of each unit has no heat conducting contact with either of the cylinders 6 or 9. Each cover is preferably provided with a downwardly projecting ring 55 of heat insulating material which engages the outer face of the cylinder 6 (see Fig. 5). Each unit is provided with a removable lid 56 which consists of the two separated members 57 and 58 with heat insulating material 59 between them, the two members being connected with a peripheral member 60 which engages a heat insulating member 61 attached to the cover 53. The lid is provided with a handle 62, by means of which it can be easily removed and replaced.

In the use of the device a certain amount of oil from the compressor gets into the circulatory system for the refrigerant and ordinarily would accumulate in the bottom of the space between cylinders 6 and 9. Some means is provided for removing any such oil or any other liquid reaching the bottom of the space between the cylinders 6 and 9 of either of the cooling units. As herein shown, the cooling units are provided at the bottom with the outlets 63, to which are connected pipes 64. These pipes extend up through the heat insulating material 8 and connect at the top with the pipes 47 which lead to the compressor. The oil or other liquid is drawn up through the pipes 64 and passes into the pipes 47 and is returned to the compressor. The oil and gas become mixed in the compressor and care has to be taken to insure as much oil being returned to the compressor as leaves it. The mixture of gas and oil, when it leaves the compressor, passes to the condenser where it is converted into a liquid. This liquid mixture then passes to the expansion valve and is there sprayed into the passageway between the cylinders 6 and 9, that is into the evaporator. As it passes through the passageway, oil is given up and settles to the bottom of the space between the cylinders 6 and 9. The gas passes out into the suction line at 50 and moves at a high velocity. This gas moves rapidly across the upper open end of the pipe 64, producing a suction in the pipe 64 adequate to cause the oil and whatever liquid refrigerant may be mixed with it to be drawn up through the pipe 64 and delivered to the pipe 47, where it becomes mixed with the warm gas in the suction line and is returned to the compressor.

Some means is provided for automatically controlling the temperature of each of the cooling units. As herein shown, each cooling unit has a bulb 65 connected with the outer face of the cylinder 6 and having a tube 66 which connects with the associated expansion valve 42 or 48 so that when the temperature is lowered below a predetermined amount, the expansion valve will be closed and when the temperature rises, the expansion valve will be opened. Any of the usual devices for this purpose may be used.

There is also means for shutting off the motor so as to shut down the compressor when a predetermined low temperature is reached. This is secured by bulb 67 which is also attached to the outer surface of the cylinder 6 and which is connected by tube 68 with a switch 69 located in the electric connection 70 from the plug 71 to the electric motor. When the temperature reaches a predetermined low point, the switch is actuated to shut off the motor and stop the compressor. When the temperature rises to a predetermined point, the switch is actuated to again connect the motor in circuit and start the compressor in operation. These control devices may be of any of the usual forms for this purpose.

The bulbs are preferably located near the outlet for the refrigerant for each of the cooling units. The bulb 65 controls the expansion valve when the temperature in the low side reaches a predetermined point. The bulb 67 controls the cycle of the starting and stopping of the motor according to the variable setting of the switch arrangement.

Each interior cylinder 9 is provided with a bottom 72 which is mounted upon an insulating member 73, which is preferably a rigid insulating member. In the particular construction shown, this insulating member 73 for each cooling unit is cylindrical and projects beyond the cylinders 6 and 9. Attached to the bottom 72 is a centering member 74 which fits into a centering opening 75 in the insulating member. There is also a connecting and centering device 76 associated with the insulating member 73 of each cooling unit, which may consist of a pin which projects into the insulating member 73 and into the base 3. The outer cylinder 5 of each cooling unit surrounds the cylinders 6 and 9 and also the insulating member 73.

The portions of the base 3 under the two cooling units have a circular or cylindrical contour for the greater part of their length. The central portion between the two cooling units being narrower and preferably having straight sides, as shown in Fig. 4. The outer cylinder 5 of each cooling unit projects along the cylindrical part of the base and is fastened thereto by the fastening devices 77. The portion of the cylinder 5 of each cooling unit which is above the straight central portion of the base preferably abuts the top of the base at these points.

The refrigerating unit, which is located between the cooling units, is enclosed. There are two side enclosing members 78 and 79 which are attached to the cooling units in any desired manner. As herein shown, there are brackets 80 and 81 attached to the cooling units and the side enclosing members are attached to these brackets by fastening devices 82. These side enclosing members are provided with ventilating openings which are shown as the louvers 83 and the aperture 84. The cover 85 is secured to the members 78 and 79 by fastening devices 86. In view of the fact that the portion of the base connecting the two cooling units is narrower than the diameter of the cooling units, the enclosing members 78 and 79 do not extend out to the widest diameter of the cooling units so that if the device is placed against a wall or the like, the projecting parts of the cooling units at each side of the enclosing members 78 and 79 will engage the wall, or the like, so as to prevent the enclosing members 78 and 79 from being brought into contact with the wall, or the like, and there will be a space between either the enclosing member 78 or 79 and the wall, so that there will be ample room for ventilation and so that it is impossible to close off the ventilating air stream.

In this construction one of the important features is that the bottoms of the cooling spaces of the cooling units are substantially on the same level as the bottom of the refrigerating unit, thereby bringing the bottoms of the cooling units very close to the floor. By this arrangement the cooling units stand up by the side of the user so that the user is able to reach down substantially to the bottom of the cooling space in each of the cooling units, the upper edge of the cooling units fitting into the armpit, thereby giving a maximum armpit clearance and still enabling the user to reach down to the bottom of the cooling spaces.

In this construction wherein there are the two cooling units with the refrigerating unit in between them, the compressor is equidistant from the two cooling units so that the two cooling units get equal treatment from the compressor.

There is a top enclosing member 85 for the refrigerating unit connected with the side enclosing members 78 and 79 by the fastening members 86. The refrigerating unit is supported in any desired manner upon the base 3. As herein shown, there is a support 87 which is preferably a sheet of metal bent in the form of a U and having its bottom fastened to the base 3, the upper edges being inwardly bent towards each other (Figs. 6 and 7). A supporting member 88 is mounted upon the support 87 and has cushioning members 94, preferably of rubber, between it and the support 87.

The motor 12 is connected with a supporting member 89, having its shaft mounted in bearings therein. The supporting member 89 is attached to the supporting member 88 by the fastening devices 91, there being cushioning devices 90 interposed between the supporting members 88 and 89.

The compressor 13 is mounted upon the supporting member 88 and is connected with the supporting member 88 by means of the lugs 92 and the fastening devices 93.

The receivers 31 and 33 are mounted upon the support 87.

I claim:

1. A refrigerating apparatus comprising two cylindrical cooling units, open at the top and separated by a space, a base upon which the two cylindrical cooling units are mounted, one at each end thereof, said base extending across the space between said cylindrical cooling units, a single refrigerant supplying unit mounted upon the portion of the base extending between said cylindrical cooling units, the cooling units, refrigerant supplying unit and base forming a unitary structure, an enclosing device for said refrigerant supplying unit having two side pieces which are attached to the outer walls of said cylindrical cooling units.

2. A refrigerating apparatus comprising two cylindrical cooling units, separately insulated, a base upon which they are mounted with a space between them, a single refrigerant supplying unit intermediate the two cooling units, two side enclosing members for the refrigerant supplying unit having ventilating openings therein, the cooling units projecting on each side outwardly beyond the side enclosing members, so that when the apparatus is placed against an obstacle there is a free space between the obstacle and the opposed side enclosing member of the refrigerant supplying unit so that the ventilating air stream through said enclosing members for the refrigerant supplying unit is maintained.

3. A refrigeration apparatus comprising two spaced, cylindrical, open-topped cooling units, a base upon which both said cooling units are mounted, each of said cooling units including a cylindrical evaporator circumferentially defining a storage space, a single refrigerant supplying unit, in circuit with both said evaporators, mounted upon the base between and generally equidistant from the cooling units, the cooling units, refrigerant supplying unit and base forming a unitary structure, that part of the unitary structure which is between the two cooling units being of less width than the diameter of the units and being set back of a line tangent to both cylinders at one side of the apparatus, thereby providing a free space between the refrigerant supplying unit and any plane surface against which the apparatus may be positioned.

4. The structure of claim 3 including a housing, about the refrigerant supplying unit, spanning the space between the cooling units.

5. The structure of claim 3 including a base having end portions conforming in contour to the cylindrical cooling units and having an intermediate connecting portion of substantially less width than the diameter of the cooling units.

WILLARD L. MORRISON.